US008116992B1

(12) United States Patent
Ludlow et al.

(10) Patent No.: US 8,116,992 B1
(45) Date of Patent: Feb. 14, 2012

(54) APPARATUS AND METHOD FOR DETERMINING SOLIDS CIRCULATION RATE (75) Inventors: J. Christopher Ludlow, Morgantown, WV (US); James L. Spenik, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 404 days.

(21) Appl. No.: 12/430,192

(22) Filed: Apr. 27, 2009

(51) Int. Cl.
*G01F 1/34* (2006.01)
*G01F 1/74* (2006.01)
*F27B 15/18* (2006.01)

(52) U.S. Cl. ........... 702/47; 73/861.04; 432/17; 432/15; 432/16; 432/18; 432/58; 122/4 D (58) Field of Classification Search ................. 702/47; 502/106; 122/4 D; 432/17; 73/861.04
See application file for complete search history.

(56) References Cited

U.S. PATENT DOCUMENTS

| | | | | |
|---|---|---|---|---|
| 4,312,234 A | * | 1/1982 | Rhodes et al. | 73/861.04 |
| 4,336,227 A | * | 6/1982 | Koyama et al. | 422/111 |
| 4,574,643 A | * | 3/1986 | Scott et al. | 327/104 |
| 4,902,138 A | * | 2/1990 | Goeldner et al. | 374/44 |
| 6,301,546 B1 | * | 10/2001 | Weinstein et al. | 702/23 |
| 2006/0010987 A1 | * | 1/2006 | Fraser et al. | 73/861.07 |
| 2010/0068116 A1 | * | 3/2010 | Kim et al. | 423/349 |

FOREIGN PATENT DOCUMENTS

WO WO2008018760 * 2/2008

OTHER PUBLICATIONS

Beek et al, Transport Phenomena, 1975, Wiley, pp. 114-121.*
Jiang et al., Chapter 12 General Approaches to Reactor Design, 2003 CRC Press, Handbook of fluidization and fluid-particle systems, pp. 309-312.*
Goshima et al., Simultaneous Measurements of Gas-Solid Flow Rates and Pressure Drop in Downcomer of J-Valve in CFB, 2007, Chem. Biochem. Eng. Q21 (4), p. 357-363.*
Mid-West Instruments, Diaphram type Model 140 Differential Pressure Transmitter, Dec. 2007 Web page, http://web.archive.org/web/20071222201011/http://www.midwestinstrument.com/transmitter/140t.asp.*
Sandidge et al., "Fluid Flow through Packed Beds: Experimental Data vs. Ergun's Equation", Mar. 31, 2005, Team 6 report, pp. 1-27; http://www.os-cfd.ru/UserFiles/File/e-library/porousity/t6_s05. pdf.*
Basu et al, "An Analysis of Loop Seal Operations in a Circulating Fluidized Bed," Trans IChemE, vol. 78, Part A, p. 991-998 (Oct. 2000).
Goshima et al,"Simultaneous Measurements of Gas-Solid Flow Rates and Pressure Drop in Downcomer of J-Valve in CFB," Chem. BioChem. Eng., Q21 (4), p. 357-363, (2007).
Sung Won Kim et al, "Solids Flow Characteristics in Loop-Seal of a Circulating Fluidized Bed," Korean J. Chem. Eng., vol. 16, p. 82-88 (1999).

* cited by examiner

*Primary Examiner* — Jonathan C Teixeira Moffat
*Assistant Examiner* — Regis Betsch
(74) *Attorney, Agent, or Firm* — James B. Potts; Brian J. Lally; John T. Lucas (57) ABSTRACT

The invention relates to a method of determining bed velocity and solids circulation rate in a standpipe experiencing a moving packed bed flow, such as the in the standpipe section of a circulating bed fluidized reactor The method utilizes in-situ measurement of differential pressure over known axial lengths of the standpipe in conjunction with in-situ gas velocity measurement for a novel application of Ergun equations allowing determination of standpipe void fraction and moving packed bed velocity. The method takes advantage of the moving packed bed property of constant void fraction in order to integrate measured parameters into simultaneous solution of Ergun-based equations and conservation of mass equations across multiple sections of the standpipe.

17 Claims, 6 Drawing Sheets

APPARATUS AND METHOD FOR DETERMINING SOLIDS CIRCULATION RATE

STATEMENT OF GOVERNMENTAL SUPPORT

The United States Government has rights in this invention pursuant to the employer-employee relationship of the Government to the inventors as U.S. Department of Energy employees and site-support contractors at the National Energy Technology Laboratory.

TECHNICAL FIELD

A method of determining bed velocity and solids circulation rate in a circulating bed fluidized reactor experiencing a moving packed bed flow in the standpipe section. The method utilizes in-situ measurement of differential pressure over known axial lengths of the standpipe in conjunction with in-situ gas velocity measurement for a novel application of Ergun equations allowing determination of standpipe void fraction and moving packed bed velocity. The method takes advantage of the moving packed bed property of constant void fraction in order to integrate measured parameters into simultaneous solution of Ergun-based equations and conservation of mass equations across multiple sections of the standpipe. The method utilizes measurement techniques that mitigate the aggressive impact of the high temperatures and gas compositions often encountered, are non-intrusive to the flow itself so that systematic errors from changes in the flow itself are minimized, that are capable of operation in large-scale units with minimized calibration requirements, and that are able to cover a broad range of circulation rates with consistent accuracy.

BACKGROUND OF THE INVENTION

Many processes involve gas and particulate solids flows where the solids are recycled back to the process for further use. Examples of such circulating flow of solids are the flow of solid catalyst in a Circulating Fluidized Bed (CFB) reactor and coating of the particles in a cycle spouted bed. In these systems, the solids circulation rate, which affects both heat and mass transport properties and determines the gas-solid contact time and the performance of the reactor, becomes a highly significant operating parameter. However, measurement challenges abound. The system by its nature promotes highly complex interactions between the gas and the particulates, and simple tracer—response methods produce results that are not unique. Attempts to avoid this complexity concentrate on estimation of the time-averaged solids flow rate across a given section, and assume it to be an estimate of the overall solids circulation rate in the closed loop. However, additional challenges are presented. The high temperatures and gas compositions commonly found in these processes are relatively aggressive to intrusive instruments, and the high pressure with particulate laden flows make the sealing of mechanical motion across the pressure boundary difficult. Further, introduction of intrusive instruments may in turn change the flow itself, leading to a systematic error in the measurement. Additionally, the flow response to specific components which may or may not be present among different circulating systems often demands a-priori calibration that is often difficult to perform in situ. All of this is compounded by the fact that operating conditions vary significantly from application to application. For example, for coal combustion, the gas velocity and solids flux are typically 5-8 m/s and less than 40 kg/m2-s, respectively. For fluid catalytic cracking (FCC), on the other hand, the gas velocity and solids flow rate are considerably higher, e.g. 15-20 m/s (at the riser exit) and greater than 300 kg/m2-s, respectively. As a result, a metering technology generically suitable for gas and particulate solids flows is still lacking.

Among the few techniques available for estimating the solids circulation rate in a hot, pressurized solids circulating system, one of the more simple methods involves the measurement of particle velocities at the wall within the packed bed portion of a standpipe. Typically, in a system utilizing circulating solids, the standpipe serves as a component in the solids recirculation loop. In applications involving chemical reactions, the standpipe may also serve as a heat regulator or spent sorbent regenerator. During operations, individual particles are tracked at the wall of the standpipe, and the time needed for an individual particle to travel a known distance is measured in order to determine a particle velocity. This velocity, in conjunction with the cross-sectional area for flow and the solids bulk density, allows a mass circulation rate to be determined. However, this method necessarily assumes that the particles at the wall travel at the same velocity as the bulk, since the presence of the bed material prevents an observer from seeing into the interior of the standpipe. This can introduce significant error. For example, particle slippage due to surface roughness and wall friction can produce a significant velocity deviation between the particle observed at the wall and the bulk flow. Additionally, there may be significant logistical hurdles to this method. For a hot unit at pressure, this technique requires a high temperature window with significant thickness to withstand the operating conditions, which at the same time must be kept sufficiently clean so that individual particles can be seen and tracked.

Another method employed involves calorimetric measurements. Many hot systems have heat exchanger equipment in the packed bed portion of the standpipe to control the temperature of the circulating solids. By measuring the temperature change and flow rate of the heat transfer fluid in the heat exchanger while simultaneously measuring the temperature change of the hot circulating solids, the solids circulation rate can be estimated. Clearly, this method is only applicable to systems incorporating submerged heat exchangers and solids at higher temperatures. Additionally, the method assumes that solids temperature is uniformly lowered by the heat exchanger, and that all of the solids flow through the heat exchanger. However, in practicality, because of heat changes driven by seal air and heat radiation, among other factors, the method requires significant plant specific calibration, especially for large systems. As an example, see "Experimental Study on an On-Line Measurement of High Temperature Circulating Ash Flux in a Circulating Fluidized Bed Boiler," Lu Xiaofeng, et al, *J. of Thermal Science*, Vol 10, No. 2 (2001).

Another method for estimating the solids circulation rate is based on gas velocity measurement in a riser. Within the riser of a solids circulating system, the gas travels upwards faster than the solids. The difference between the gas velocity and the solids velocity is called the slip velocity. Knowledge of slip velocity and solids concentration in the riser allows determination of a solids mass circulation rate. However, solids flow dynamics in gas-solid risers is inherently complex, and the solids slip velocity is not a simple function of operating conditions. Any measurement of gas velocity using this method will likely be assuming a plug flow through the riser, which can be significantly at odds with the actual situation. See, e.g., "Investigation on slip velocity distributions in the riser of dilute circulating fluidized bed," Yang Y.-L, et al,

*Powder Technology*, Vol. 73, pp. 67-73 (1992). Further, solids concentration is not uniform across the diameter of the riser, and shear forces between the riser wall and the particles increase the error in the solids concentration estimate using pressure drop measurements. Additionally, these techniques may introduce invasive probes into the riser, changing the flow itself and leading to a systematic error in the measurement.

Another method for estimating the solids circulation rate is based on pressure drop across a specific part of the equipment or across an orifice. In this method, experimentally measured pressure drop, together with the gas velocity, is correlated with the solids mass flux. This technique is effectively non-interfering with the flow in the riser, however, because different combinations of gas and solids flowrates can lead to the same pressure drop, the solids mass flux must be independently estimated using a time-of-descent method or some other method. See, e.g., "Development of a J-shaped Pneumatic Valve to Control the Solid Particle Circulation rate in a Circulating Fluidized Bed," Terasaka, K. et al., *Powder Technology*, Vol 126, p. 13-21 (2002). This necessitates a calibration process which can be arduous for industrial scale equipment.

In order to avoid the issues associated with the aggressive impact of high temperature and gas compositions, the intrusiveness of measuring instruments leading to systematic error, and the difficulty of extensive calibration in large-scale units, flow correlations such as the Ergun equation have been utilized to correlate moving bed flow with relatively easily obtained pressure measurements. The Ergun equation is well known and traditionally used to describe the pressure drop of a liquid or gas flowing through a stationary packed bed. It relates the pressure drop to a specified flow rate, the flowpath length through the bed, the equivalent spherical diameter of the particles in the bed, the density and dynamic viscosity of the liquid or gas, the velocity of the liquid or gas with respect to the bed, and the void fraction of the bed. See, *Coulson and Richardson's Chemical Engineering*, Richardson, J., et al., Butterworth-Heinemann (2002), among many others. This concept is further extended to moving packed beds where both the liquid or gas and the fixed bed itself are in motion relative to a containing plant component, such as a standpipe in a circulating fluidized bed reactor. For these situations, the Ergun equation and its modified forms utilize the concept of superficial gas velocity, sometimes termed slip velocity, which is simply defined as the relative velocity between the fluid or gas and the moving packed bed. Determination of the superficial gas velocity and separate measurement of the gas velocity with respect to the standpipe is then used to determine bed velocity with respect to the standpipe, and the subsequent solids flowrate. See, *Fluidization, Solids Handling, and Processing: Industrial Applications*, Yang, W., Noyes Publications (1999), among many others. Typically in practice, the pressure drop over a length of bed is measured while the equivalent particle diameter, gas density, and gas viscosity is estimated, and the superficial gas velocity and void fraction remain as unknown quantities. At that point, the value of void fraction is often further assumed in order to finalize a superficial gas velocity. For example, see "An Analysis of Loop Seal Operations in a Circulating Fluidized Bed," Basu, P. et al., *Trans IChemE*, Vol. 78, Part A, p. 991-998 (October 2000); see also "Simultaneous Measurements of Gas-Solid Flow Rates and Pressure Drop in Downcomer of J-Valve in CFB," Goshima, T., et al, *Chem. BioChem. Eng.*, Q 21 (4), p. 357-363 (2007); and see also "Solids Flow Characteristics in Loop-Seal of a Circulating Fluidized Bed," Sung Won Kim, et al, *Korean J. Chem Eng.*, Vol 16, p. 82-88 (1999).

Another commonly used approach is to express the void fraction as a linear function of the superficial gas velocity, thereby leaving superficial gas velocity as the only remaining unknown. See, e,g., *Pneumatic Conveying of Solids: A Theoretical and Practical Approach*, Klinzing, G., et al., Springer (1997), among many others. However, this treatment of void fraction, heretofore necessary, can introduce significant error when an Ergun correlation is used to determine a superficial gas velocity.

Mathematically, the void fraction typically appears in Ergun correlations as a cubed term and any errors in the void fraction value have a dramatic effect on mathematically determined superficial gas velocities. For example, a 5% error in the void fraction will produce a 55% error in the slip velocity. Therefore, it is necessary to determine void fraction with a great deal of precision. See *Chemical Reactor Design*, Harriott, P., CRC Press (2003). In moving bed flow, this is additionally complicated by the fact that the void fraction may not be constant with time, and can change based on changes in operating parameters elsewhere in the system. For example, in a circulating fluidized bed characterized by a riser loop and a recirculating standpipe, under normal operating conditions with a constant mass circulation rate, the pressure drop across the riser is balanced by the pressure drop across the standpipe loop. If a small reduction in gas velocity through the riser takes place, the flow in the riser responds by increasing the pressure drop across the riser. The increase in pressure drop must be balanced by an increase in pressure drop in the standpipe. This increased pressure drop in the standpipe will change the flow of gas through the standpipe and shift the operating value of void fraction in the standpipe. This can introduce further error into the estimated value of void fraction, and further error in the values of superficial gas velocity determined using Ergun correlations.

What is needed is a technique for measuring solids flowrate which mitigates the aggressive impact of the high temperatures and gas compositions often encountered, is non-intrusive to the flow itself so that systematic errors from changes in the flow itself are minimized, is capable of operation in large-scale units with minimized calibration requirements, and is able to cover a broad range of circulation rates with consistent accuracy by determination of void fractions and superficial gas velocities based on operating parameters.

Accordingly, an object of one embodiment is to provide the bed velocity of a moving packed bed in the standpipe of a circulating bed reactor by measuring the differential pressure and gas velocity in a first section of the standpipe over a first axial distance and in a separate second section of the standpipe over a second axial distance, and determining the void fraction and bed velocity based on an Ergun correlation describing the interaction of measured parameters in the first and second sections.

It is another object of one embodiment to provide the bed velocity of a moving packed bed in the standpipe of a circulating bed reactor utilizing a method where the fixed moving bed void fraction is determined based on in-situ measurement of operating conditions, rather than assumed as a constant value or related to other prevailing conditions in the standpipe with empirical relationships, thereby minimizing the impact of void fraction error stemming from initial assumptions or changes in plant operating condition.

It is another object of one embodiment to provide the bed velocity of a moving packed bed in the standpipe of a circulating bed reactor utilizing a method which avoids plant specific calibration, by providing a method whereby operating conditions in an instrumented standpipe section are observed and related to bed velocity with Ergun correlations for gas or fluid flow through a moving packed bed applied to that instrumented standpipe section, thereby avoiding a large number of plant specific variables.

It is another object of one embodiment to provide the bed velocity of a moving packed bed in the standpipe of a circulating bed reactor utilizing measurement techniques that mitigate the aggressive impact of high temperatures and gas compositions in the circulating bed reactor on measurement instruments.

It is another object of one embodiment to provide the bed velocity of a moving packed bed in the standpipe of a circulating bed reactor utilizing measurement techniques that are non-intrusive to the flow itself, mitigating any systematic errors introduced by measurement instruments.

SUMMARY OF INVENTION

An embodiment of the novel apparatus and method presented herein allows determination of bed velocity and solids circulation rate of a circulating bed fluidized reactor experiencing a moving packed bed flow in the standpipe section. This is accomplished through measurement of differential pressure over known axial sub-lengths of the standpipe in conjunction with gas velocity measurement, allowing novel application of Ergun correlations for determination of standpipe void fraction and moving packed bed velocity. The apparatus and method takes advantage of the moving packed bed property of constant void fraction in order to integrate measured parameters into simultaneous solution of Ergun correlations and conservation of mass equations across multiple sections of the standpipe, and provides void fraction, bed velocity, and solids circulation rate. The method utilizes measurement techniques that mitigate the aggressive impact of the high temperatures and gas compositions often encountered, are non-intrusive to the flow itself so that systematic errors from changes in the flow itself are minimized, are capable of operation in large-scale units with minimized calibration requirements, and are able to cover a broad range of circulation rates with consistent accuracy.

The apparatus and method described herein allows determination of solids flowrate in a moving packed bed. In a moving packed bed, a bed of particles moves through a pipe or other flow conduit aided by gas or liquid flow through the conduit. The relative velocity between the gas or liquid and the particles is less than or equal to the minimum fluidization velocity and the particles do not move relative to each other. Correspondingly, void fraction in the moving packed bed, as defined by the volume of gas divided by the total volume of particles and gas, is treated as constant. Such moving packed beds find numerous application in, for example, petrochemical industry in fluid catalytic cracking and the utility industry in coal combustion.

In the numerous applications utilizing moving packed beds, the solids circulation rate, which affects both heat and mass transport properties and determines the gas-solid contact time and the performance of the reactor, becomes a highly significant operating parameter. The method described herein provides for determination of solids circulation rate through observation of operating parameters in the standpipe section and subsequent calculation of mass flow using Ergun correlations known in the art. The apparatus utilizes two sections of a standpipe separated by at least one aeration port, where each section has a differential pressure means for the measurement of differential pressure over a known length, and a gas velocity means, for measurement of a gas velocity through the sections. In operation, when the standpipe contains a contiguous moving packed bed over the two sections and the at least one aeration port provides aeration air between the two sections, Ergun correlations having the form $dP/dL = A\, V_R + B\, \rho_{GAS}\, V_R^2$ are formulated for each section and the formulations are solved to determine the moving packed bed velocity and void fraction, and subsequently the solids circulation rate.

DETAILED DESCRIPTION OF THE PREFERRED EMBODIMENTS

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a technique for measuring solids flowrate which mitigates the aggressive impact of the high temperatures and gas compositions often encountered, is non-intrusive to the flow itself so that systematic errors from changes in the flow itself are minimized, is capable of operation in large-scale units with minimized calibration requirements, and is able to cover a broad range of circulation rates with consistent accuracy through utilization of Ergun correlations.

As used herein, the term "Ergun correlation" means a formulation relating pressure drop, superficial gas or liquid velocity, void fraction, and parameters which may be estimated or measured in flow across moving packed beds. Ergun correlations often take the form $dP/dL = A\, V_R + B\, \rho_{GAS}\, V_R^2$, where $V_R$ describes a relative velocity between a gas or liquid and a particulate bed, and A and B are formulations tailored to the specifics of the flow situation, including situations where either A or B may have a zero value. Those skilled in the art recognize that alternate formulations tailored to specific flow situations is a long standing and continued effort. See, e.g., Macdonald, et al, "Flow Through Porous Media—The Ergun Equation Revisited," *Ind. Eng. Chem. Fundamen.*, 1979, 18(3), among many others. The alternative formulations tailored to specific flow situations may be utilized without invalidating the method presented herein.

As used herein, the term "standpipe" means a pipe situated to enclose a flow of incompressible solid particles and having substantially uniform cross-section over a standpipe axial length, where the standpipe axial length is some contiguous portion of the standpipe longitudinal axis.

As used herein, the term "packed bed" means a layer of incompressible particles or objects enclosed in a standpipe and experiencing intimate contact between individual incompressible particles or objects within the layer of incompressible particles or objects.

As used herein, the term "moving packed bed" means a packed bed moving over a standpipe axial length and having a bed velocity with respect to the standpipe, such that the mass flow rate of the packed bed is substantially equivalent at all points along the standpipe axial length.

Principles

The apparatus and method described herein allows determination of solids flowrate in a moving packed bed. In a moving packed bed, a bed of particles moves through a pipe or other flow conduit aided by gas or liquid flow through the conduit. The relative velocity between the gas or liquid and the particles is less than or equal to the minimum fluidization velocity and the particles do not move relative to each other. Correspondingly, void fraction in the moving packed bed, as defined by the volume of gas divided by the total volume of particles and gas, is treated as constant. See *Handbook of Fluidization and Fluid-particle Systems*, Wen-Ching Yang, CRC Press (2003). Such moving packed beds find numerous application in, for example, petrochemical industry in fluid catalytic cracking and the utility industry in coal combustion.

Figure 1:
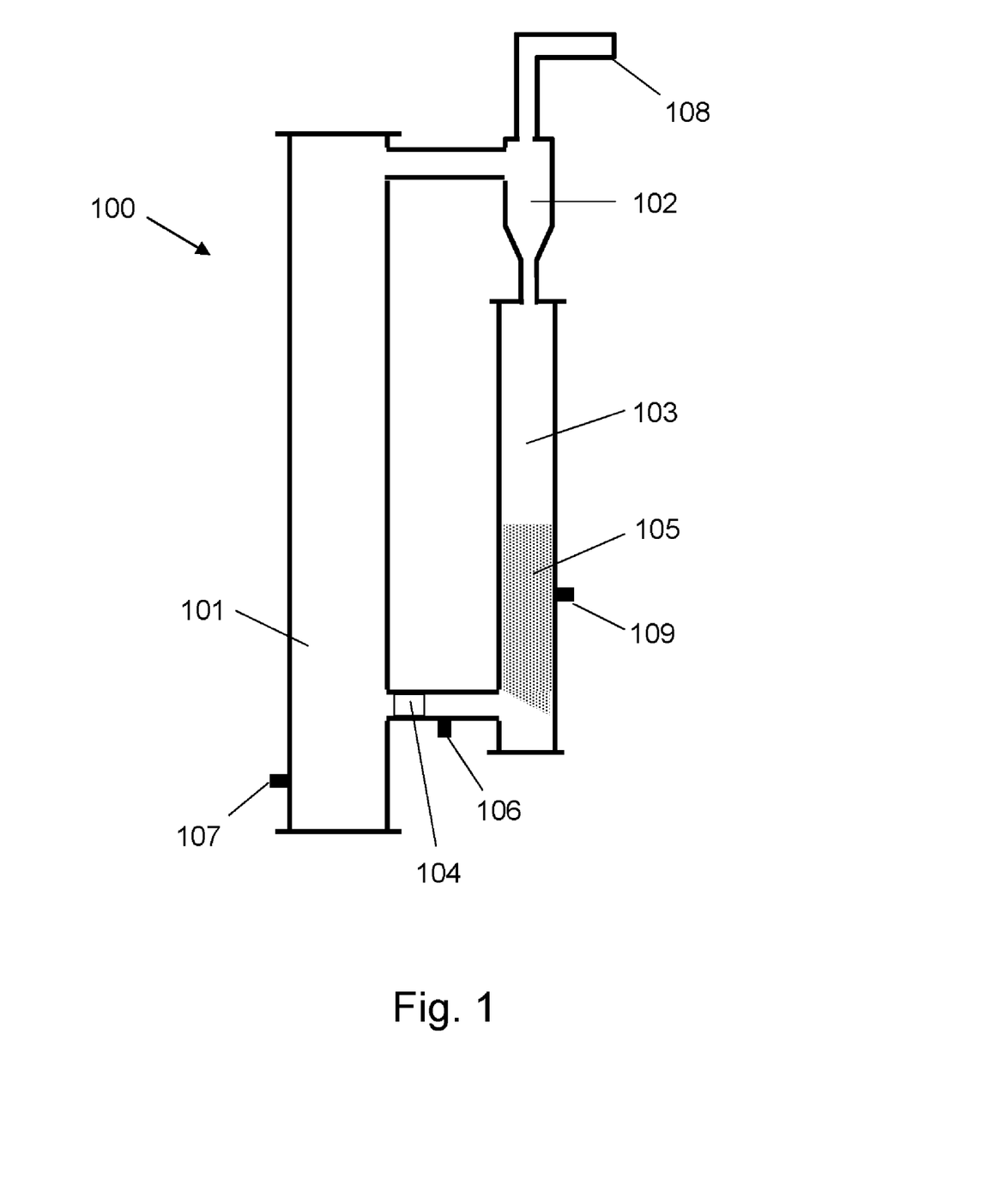
FIG. 1 illustrates a typical CFB having riser, a particulate collection system, a standpipe, and solids flow control valve.

As an example of a process utilizing a moving packed bed, consider a circulating fluidized bed (CFB) reactor. A CFB reactor can function as a heavy oil cracker, combustor or gasifier to process carbonaceous materials. For all of these applications, the CFB reactor typically comprises similar components, namely a riser, a particulate collections system, a standpipe and a solids flow control valve. This is illustrated at FIG. 1, showing a CFB 100 having riser 101, particulate collection system 102, standpipe 103, and solids flow control valve 104. CFB 100 circulates the solids comprising moving packed bed 105 contained in standpipe 103 by injecting solids from moving packed bed 105 through the solids flow control valve 104 into the riser 101 with aeration air injected through aeration port 106. Riser air is injected through riser port 107 to produce an upward flow of gas-solids mixture in the riser 101. The gas-solids mixture flows from the riser to particulate collection system 102, where the gas and solids are separated. The gas exits CFB 100 through gas exit 108. The solids exit particulate collection system 102 and enter standpipe 103, and gravitationally flow down standpipe 103 back to moving packed bed 105, to begin the recirculation process anew, so that moving packed bed 105 is depleted of solids via solids flow control valve 104 while simultaneously receiving solids from the particulate collection system 102, and the solids comprising moving packed bed 105 are simultaneously moving through moving packed bed 105. Aeration air is supplied to standpipe 103 through aeration port 109 to assist the solids in moving down standpipe 103 through moving packed bed 105.

In the numerous applications utilizing systems similar to that illustrated in FIG. 1, the solids circulation rate, which affects both heat and mass transport properties and determines the gas-solid contact time and the performance of the reactor, becomes a highly significant operating parameter. The method described herein provides for determination of solids circulation rate through observation of operating parameters in the standpipe section and subsequent calculation of mass flow using Ergun correlations known in the art.

Figure 2:
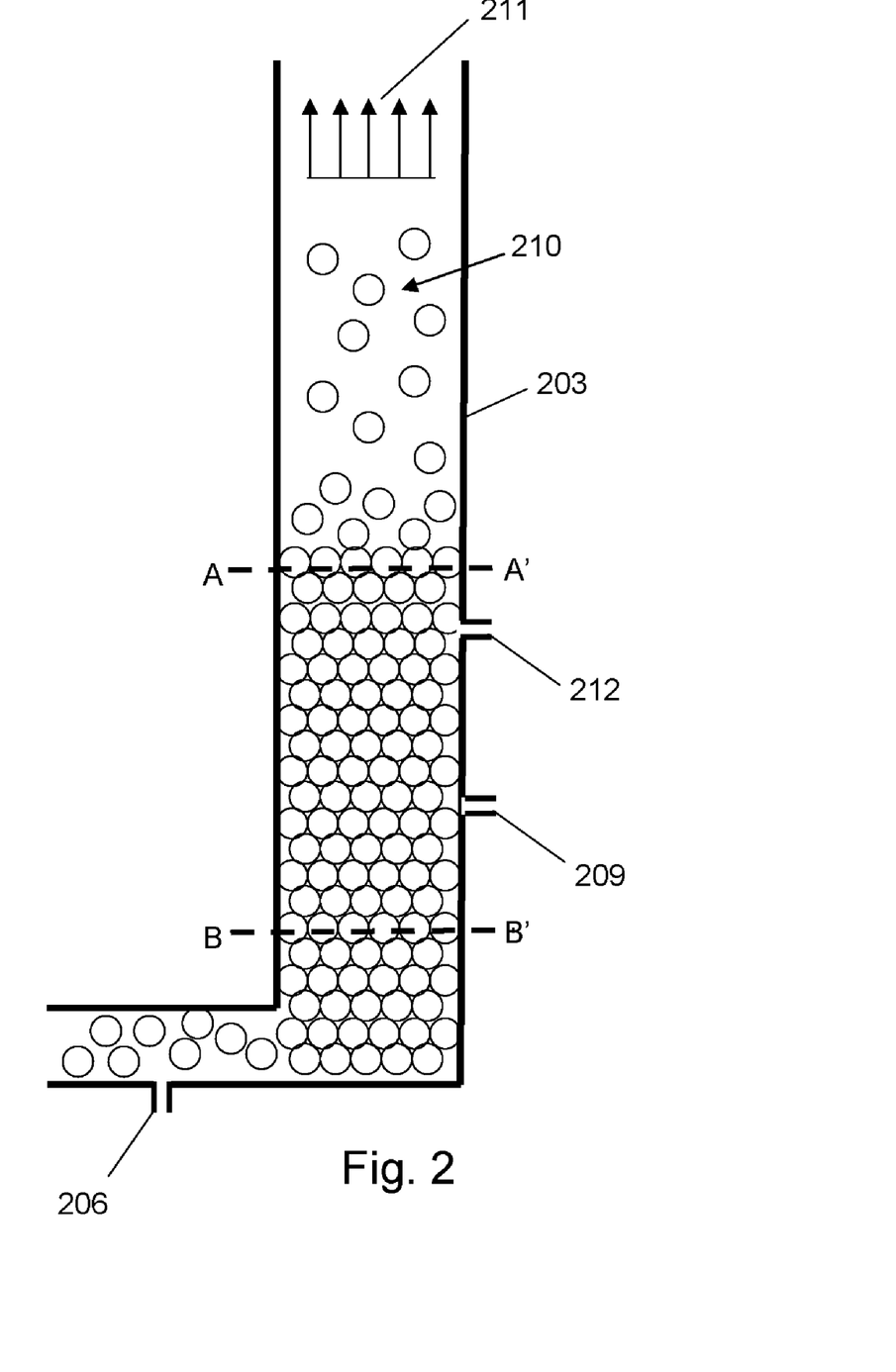
FIG. 2 illustrates a standpipe receiving solids experiencing a superficial gas flow and forming a moving packed bed.

FIG. 2 demonstrates a detailed view of standpipe 203. Standpipe 203 contains particles 210 received from a particulate collection system (not shown). The particles 210 collect in the standpipe 203 and form a moving packed bed between axis AA' and axis BB'. In the region between axis AA' and BB', the moving packed bed moves at a velocity $V_{BED}$ with respect to standpipe 203. However, as discussed infra, the particles 210 comprising the moving packed bed do not move relative to each other, and void fraction in the moving packed bed is treated as having a constant, though unknown, value. The moving packed bed is assisted in moving down standpipe 203 by aeration air supplied through aeration ports 209 and 212. Aeration ports 209 and 212 are constructed for fluid communication with the interior of standpipe 203. At the base of standpipe 203, particles 210 detach from the moving packed bed aided by aeration air from air port 206 and move into the riser (not shown). Throughout this process, gas flow 211 flows through standpipe 203 and through the moving packed bed at a velocity $V_{GAS}$ with respect to standpipe 203. Although represented in FIG. 2 as a flow in the upward direction, gas flow 211 may flow either up or down in standpipe 203.

When the gas flows through the moving packed bed of solids it exerts a drag force on the particles, causing a pressure drop across the bed in the nominal direction of the gas flow. The pressure drop over the moving packed bed can be related to operating conditions in standpipe 203 using Ergun correlations for flow through a packed column with modification for moving packed beds. Once such Ergun correlation takes the form:

$$\frac{\Delta P}{\Delta L} = \frac{150\mu V_{SUP}(1-\varepsilon)^2}{D_p^2 \varepsilon^3} + \frac{1.75 \rho V_{SUP}|V_{SUP}|(1-\varepsilon)}{D_p \varepsilon^3} \quad (1)$$

Where the superficial gas velocity, $V_{SUP}$, is:

$$V_{SUP} = \varepsilon(V_{GAS} - V_{BED}) \quad (2)$$

and:

$\Delta P/\Delta L$ is the pressure drop of the gas flow 211 through the moving packed bed per unit length of standpipe 203, $\varepsilon$ is the void fraction, defined by the volume of gas in the moving packed bed divided by the total volume of the moving packed bed, $D_p$ is the effective diameter of particles 210, $\mu$ is the dynamic viscosity of gas flow 211 flowing through the moving packed bed, and $\rho$ is the density of gas flow 211 flowing through the moving packed bed.

In equation (1), $|V_{SUP}|$ represents the absolute value of the vector quantity $V_{SUP}$. The second term of equation (1) is often represented containing $V_{SUP}^2$, however the product of $V_{SUP}$ and $|V_{SUP}|$ is utilized within the method presented herein in order to preserve the vector property.

As is well known, equations (1) and (2) or variants thereof are commonly used in the characterization of gas or liquid flow through packed beds, both moving and stationary. In practice, typically, a differential pressure is measured, the gas and particle properties are estimated based on prevailing operating conditions, and void fraction $\varepsilon$ and superficial gas velocity $V_{SUP}$ are remaining unknowns. The void fraction $\varepsilon$ is then eliminated as an unknown by either assigning a constant value or relating it to the superficial gas velocity with an empirical correlation. See, e.g., *Multiphase Flow and Fluidization: Continuum and Kinetic Theory Descriptions*, Gidaspow, D., Academic Press (1994). The result allows determination of superficial gas velocity $V_{SUP}$) and subsequent determination of moving packed bed velocity and mass flow rate. However, the validity of any results determined in this practice clearly depends strongly on the proper characterization of void fraction $\varepsilon$, since any errors in the characterization are carried forward to the final determination of moving packed bed velocity. For example, a 5% error in the void fraction will produce a 55% error in the slip velocity. See *Chemical Reactor Design*, Harriott, p. 361. This is further complicated in moving bed flow in the standpipe of a CFB, because the void fraction ε is impacted by changes in operating parameters elsewhere in the system. In a CFB where system pressures provide the motive force for solids movement rather than a direct feeding device, the pressure gradient along the standpipe axis is hydrodynamically coupled with the pressure gradient along the riser axis. Further, the pressure gradient across the riser is strongly impacted by changes in CFB operating conditions such as solids inventory within the riser. As a result, changes in CFB operating conditions impact the pressure gradient in the standpipe, which impacts the void fraction ε. See *Solids Handling, and Processing: Industrial Applications*, Yang, p. 111. This further exacerbates inaccuracies in moving packed bed velocity determination based on assumed and correlated void fraction values.

The apparatus and method presented herein utilizes Ergun correlations in two sections of the standpipe separated by at least one aeration port in order to relate operating conditions in the sections and determine both superficial gas velocity $V_{SUP}$ and void fraction ε based on measured operating parameters. This minimizes the impact of void fraction errors discussed supra and allows accurate determination of superficial gas velocity $V_{SUP}$ and solids mass flow rate. The apparatus and method utilizes measured differential pressure across sections of interest and measured gas velocity $V_{GAS}$ through the moving packed bed in those sections. Aeration points between the sections avoid mathematically trivial relationships from section to section, and Ergun correlations in conjunction with conservation equations allow determination of void fraction ε and superficial gas velocity $V_{SUP}$ based on observed operating parameters. It is recognized that although the method is illustrated by reference to a CFB utilizing gas flow, the method is equally applicable to situations using a liquid medium rather than gas, and that the term "aeration point" may refer to the injection of either a gaseous or liquid medium provided to the standpipe between sections in order to assist solids flow down the standpipe.

As will be understood by those skilled in the art, this method is based on formulations of pressure drop across moving packed beds taking the traditional form $dP/dL = A \cdot V_R + B \cdot \rho_{GAS} \cdot V_R^2$, where $V_R$ describes a relative velocity between a gas and a particulate bed, and A and B are formulations tailored to the specifics of the flow situation, including situations where either A or B may have a zero value. Here equations (1) and (2) are utilized as representations of this traditional form, however alternate formulations tailored to specific flow situations may be utilized without invalidating the method presented herein.

Description of a Preferred Embodiment

Figure 3:
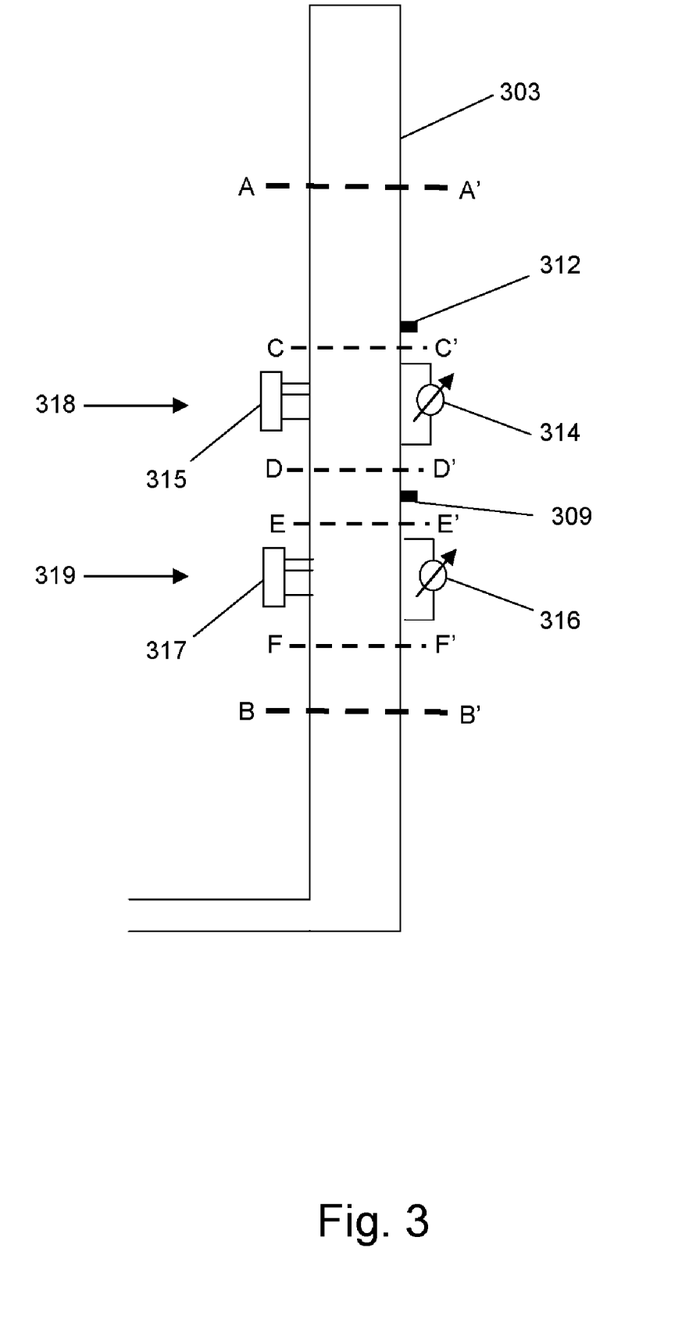
FIG. 3 illustrates a standpipe containing a first section and a second section for determination of void fraction and bed velocity.

FIG. 3 illustrates a standpipe 303 having a standpipe axial length along the longitudinal axis of the standpipe from AA' to BB'. Standpipe 303 has a first axial sub-length from CC' to axis DD', and has a second axial sub-length from EE' to FF'. As illustrated in FIG. 3, the first axial sub-length from CC' to DD' and the second axial sub-length from EE' to FF' are separate segments of the standpipe axial length from AA' to BB'. The first axial sub-length and the second axial sub-length define a first section 318 and a second section 319 respectively, where first section 318 is that portion of standpipe 303 surrounding the first axial sub-length from CC' to DD', and the second section 319 is that portion of standpipe 303 surrounding the second axial sub-length from EE' to FF'.

Standpipe 303 has one or more aeration ports, illustrated in FIG. 3 as aeration ports 309 and 312. At least one of the aeration ports, illustrated in FIG. 3 as aeration port 309, is connected to standpipe 303 between first section 318 and second section 319, such that aeration port 309 fluidly communicates with the interior of standpipe 303 between the first section 318 and the second section 319. Remaining aeration ports, represented in FIG. 3 as aeration port 312, are connected to standpipe 303 outside the volume bounded by first section 318 and second section 319. Standpipe 303 may have any number of aeration ports, provided that at least one fluidly communicates with standpipe 303 between first section 318 and second section 319, and provided that none of the aeration ports fluidly communicate with standpipe 303 within the volume bounded by first section 318 or second section 319.

A first differential pressure sensor 314 is connected to standpipe 303 within the first section 318. First differential pressure sensor 314 serves as a means for providing differential pressure between two discrete points separated by a first pressure length within the first axial sub-length between CC' and DD'. The first pressure length is contained within the first section and is parallel to or a segment of the first sub-axial length. In a preferred embodiment, the first pressure length is substantially equivalent to the first axial sub-length between CC' and DD'. The first differential pressure sensor 314 may be an instrument designed to measure the difference in pressure between two discrete points and present the resultant differential pressure directly, or may be a set of instruments indicating static pressure at two discrete points, with the differential pressure calculated as the difference. The first differential pressure sensor 314 may be a bellows, diaphragm, semiconductor strain sensor, or other sensors well known in the art, and may relay pressures of interest using an analog pneumatic, analog electronic, digital electronic signal, or using other methods well known in the art. A suitable first differential pressure sensor 314 and first pressure length is a pressure transmitter capable of measuring 0.25-2.0 psid over a 2-4 feet first pressure length, manufactured by ROSEMOUNT, Inc., Chanhassen, Minn.

A first gas velocity sensor 315 is connected to standpipe 303 within the first section 318. First gas velocity sensor 315 serves as a means for providing a first gas velocity over a first gas length within the axial sub-length between CC' and DD'. The first gas length is contained within the first section and is parallel to or a segment of the first sub-axial length. In a preferred embodiment, the first gas length is substantially equivalent to the first axial sub-length between CC' and DD'. The first gas velocity sensor 315 may be a gas tracer device, a laser device, a hot wire anemometer device, or other devices known in the art for determination of gas velocity through a moving packed bed.

A second differential pressure sensor 316 is connected to standpipe 303 within the second section 319. Second differential pressure sensor 316 acts in second section 319 in a manner similar to that described for first differential pressure sensor 314 in first section 318. Second differential pressure sensor 316 serves as a means for providing differential pressure between two discrete points separated by a second pressure length within the second axial sub-length between EE' and FF'. The second pressure length is contained within the second section and is parallel to or a segment of the second sub-axial length. In a preferred embodiment, the second pressure length is substantially equivalent to the second axial sub-length between EE' and FF'. The second differential pressure sensor 316 may be an instrument designed to measure the difference in pressure between two discrete points and present the resultant differential pressure directly, or may be a set of instruments indicating static pressure at two discrete points, with the differential pressure calculated as the difference. The second differential pressure sensor 316 may be a bellows, diaphragm, semiconductor strain sensor, or other sensors well known in the art, and may relay pressures of interest using an analog pneumatic, analog electronic, digital electronic signal, or using other methods well known in the art. A suitable second differential sensor 314 and second pressure length is a pressure transmitter capable of measuring 0.25-2.0 psid over a 2-4 feet second pressure length, manufactured by ROSEMOUNT, Inc., Chanhassen, Minn.

A second gas velocity sensor 317 is connected to standpipe 303 within the second section 319. Second gas velocity sensor 317 acts in second section 319 in a manner similar to that described for first gas velocity sensor 315 in first section 318. Second gas velocity sensor 317 serves as a means for providing a second gas velocity over a second gas length within the second axial sub-length between EE' and FF'. The second gas length is contained within the second section and is parallel to or a segment of the second sub-axial length. In a preferred embodiment, the second gas length is substantially equivalent to the second axial sub-length between EE' and FF'. The second gas velocity sensor 317 may be a gas tracer device, a laser device, a hot wire anemometer device, or other devices known in the art for determination of gas velocity through a moving packed bed.

Figure 4:
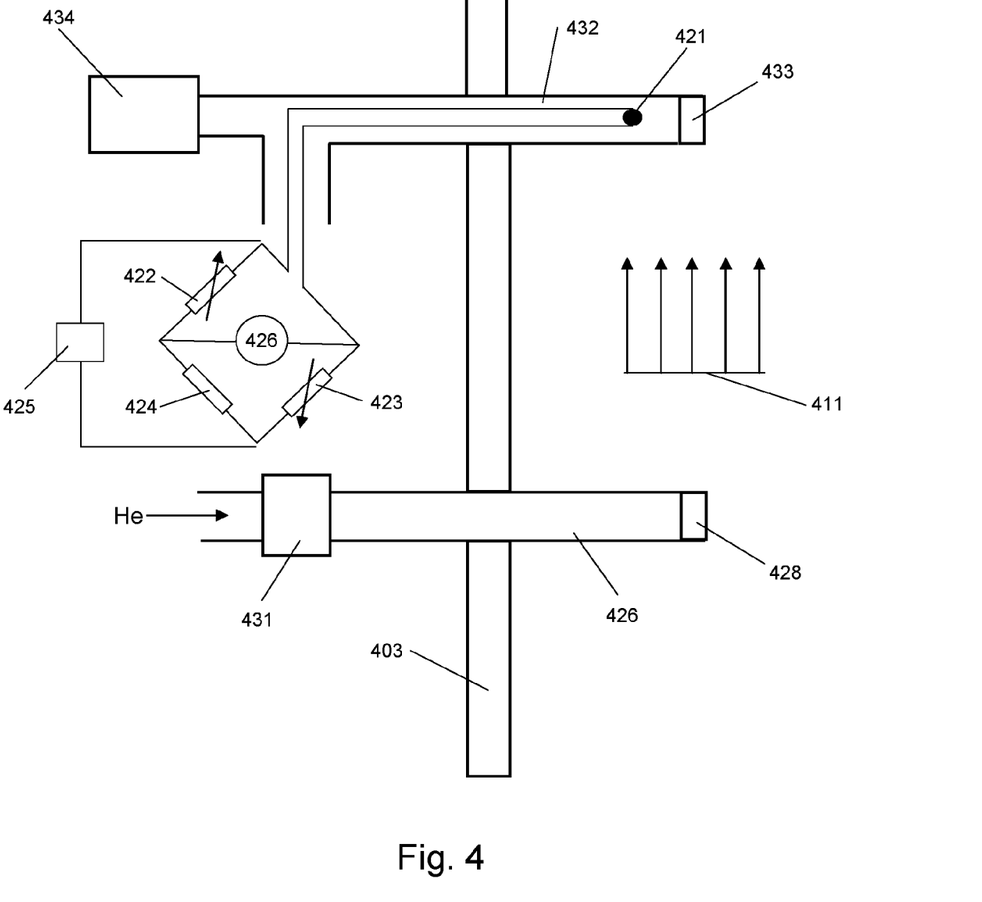
FIG. 4 illustrates a gas tracer device using helium as a trace gas.

For standpipes utilizing gas flow, a gas tracer device developed at the National Energy Technology Laboratory (NETL) which utilizes helium as the trace gas is particularly suited for use as the first gas velocity sensor 315 and the second gas velocity sensor 317. This gas tracer device is illustrated at FIG. 4. As illustrated, helium injection probe 426 is inserted through standpipe 403 and into gas flow 411. Helium injection probe 426 is connected to solenoid valve 431 and is tipped with first filter 428. Similarly, thermistor probe 432 is inserted through standpipe 403 and into gas flow 411, however thermistor probe 432 is inserted such that thermistor probe 432 is upstream of helium probe 426 in gas flow 411. Thermistor probe 432 is connected to vacuum pump 434 and tipped with second filter 433. Additionally, thermistor probe 432 contains thermistor 421. Thermistor 421 is connected in a Wheatstone bridge with first variable resistor 422, second variable resistor 423, and reference resistor 424. DC source 425 supplies power to the Wheatstone bridge and gage 426 provides indication of bridge balance. In operation, gas flow 411 flows in standpipe 429 over helium injection probe 426 then thermistor probe 432. Vacuum pump 434 operates to cause a flow of gas from gas flow 411 to be drawn through second filter 433 and over thermistor 421. Vacuum pump 434 maintains a critical pressure ratio across second filter 433 to insure the flow of gas through second filter 433 is relatively constant relative to any fluctuating conditions in gas flow 411. Then, first variable resistor 422 and second variable resistor 423 are adjusted to balance the Wheatstone bridge as indicated by gage 426. Exact balancing is not required, as the gas tracer device relies on variations in bridge balance rather than specific magnitudes. Solenoid valve 431 then momentarily opens to allow a helium pulse from helium flow He through helium probe 426 and into gas flow 411. First filter 427 assists in dispersing the helium pulse into gas flow 411.

The helium pulse is carried by gas flow 411 from helium injection probe 426 to thermistor probe 432. As the helium pulse reaches thermistor probe 423, some portion of the helium pulse is drawn through second filter 433. This alters the heat transfer characteristics of the gas flowing past thermistor 421, altering the temperature and the resistive characteristics of thermistor 421, and altering the bridge balance indicated by gage 426. Gas velocity is determined by the separation between helium injection probe 426 and thermistor probe 432 and the time elapsed between operation of solenoid valve 431 and detection of the bridge imbalance, taking into account the intrinsic time delays of the gas tracer device.

An advantage of the gas tracer device as described herein when used for first gas velocity sensor 315 and the second gas velocity sensor 317 is the ability to insert helium injection probe 426 and thermistor probe 432 into gas flow 411 a sufficient distance from standpipe 403 such that the gas velocities obtained accurately reflect typical plug flow assumptions in the standpipe. Additionally, the critical pressure ratio across second filter 433 maintains a relatively constant flow of gas past thermistor 421 such that any thermistor 421 response can be attributed to gas composition changes rather than any fluctuating conditions in gas flow 411. Additionally, the gas tracer device may be sufficiently small such that intrinsic time delays are short, alteration of inherent flow characteristics in the standpipe are negligible, and the time scale of each helium injection is reduced such that constant temperature in the system can be assumed. In one gas tracer device constructed and operated by NETL as a gas velocity means, thermistor 421 is a SENSOR SCIENTIFIC S14A10225 manufactured by Sensor Scientific, Inc., Fairfield, N.J. Solenoid valve 431 is a PETER/PAUL PN 52N8DGB, manufactured by Peter Paul Electronics, Inc., New Britain, Conn. Operation of solenoid valve 431 is controlled using a CRYDOM DO061A relay manufactured by Crydom, Inc., San Diego, Calif., driven by a computer generated square wave. The helium injection probe 426 and the thermistor probe 432 are 9.5 mm nominal diameter, 0.3 m long, stainless steel tubes, and first filter 428 and second filter 433 are 6.4 mm diameter, 25.4 mm long, 20 µm pore size sintered metal filters. First variable resistor 422 is variable between 0-2000 ohms and second variable resistor 423 is variable between 0-1000 ohms. DC source 425 supplies 5.5 VDC to the wheatstone bridge. This gas tracer device has an intrinsic time delay of 14.6 ms, determined in a 4.6 m/s flow with helium injection probe 426 and thermistor probe 432 separated by 15.3 cm.

FIG. 4 illustrates a 2-wire Wheatstone bridge as an exemplary bridge circuit with thermistor 426 as the active element, however the bridge circuit may be 3-wire or 4-wire Wheatstone bridge, or may be an alternative bridge circuit typically utilized for resistance measurement such as a Kelvin double bridge, a Maxwell bridge, or other suitable bridge circuits known in the art.

Operation of a Preferred Embodiment

Figure 5:
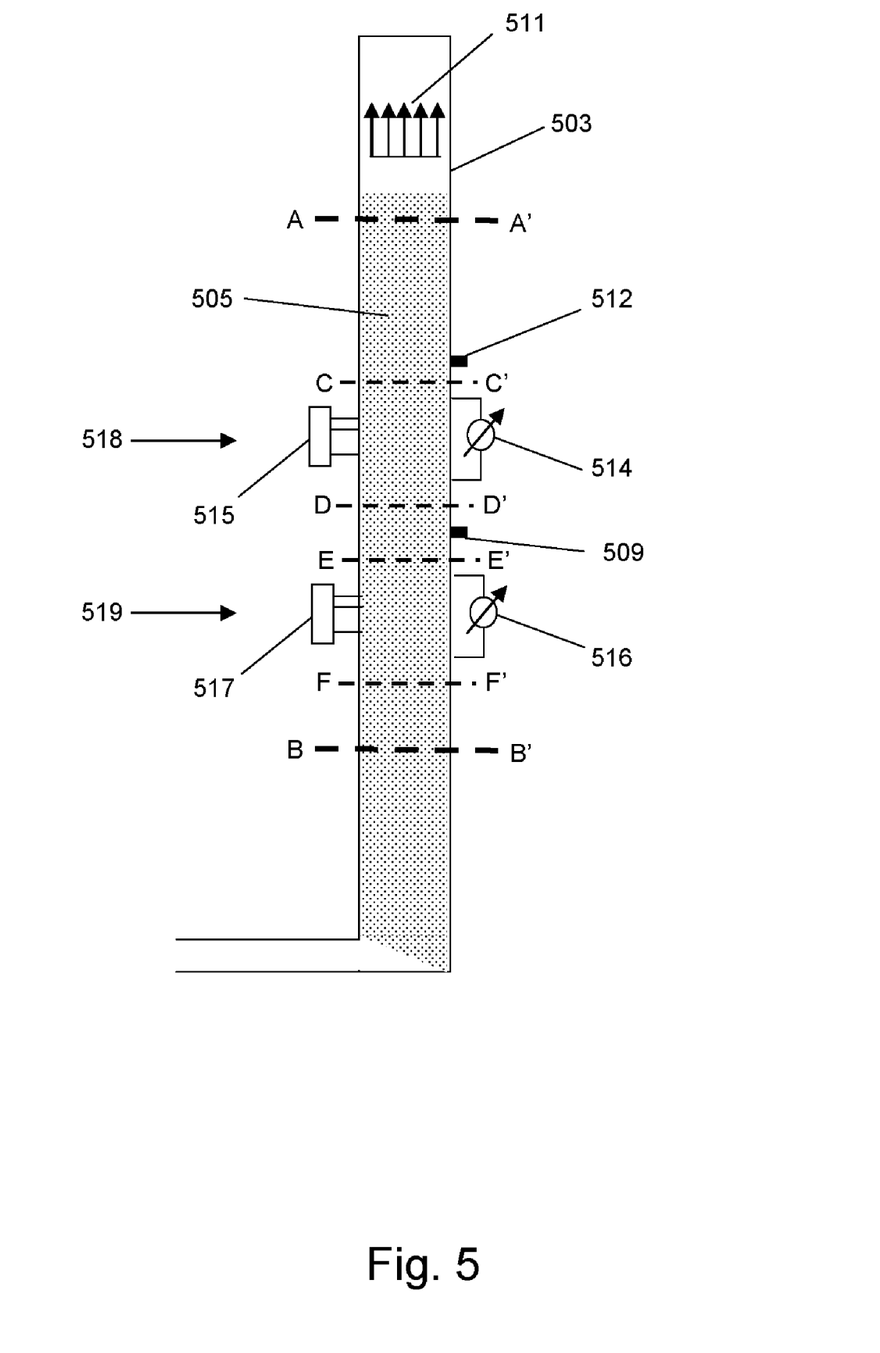
FIG. 5 illustrates a standpipe containing a first section and a second section and containing a moving packed bed flow and gas flows in the standpipe.

A method of operation using the particular embodiment discussed supra is illustrated with reference to FIG. 5. FIG. 5 illustrates standpipe 503 containing moving packed bed 505 over the standpipe axial length from AA' to BB'. In the region between AA' and BB', the moving packed bed 505 moves at a velocity $V_{BED}$ with respect to standpipe 503. Moving packed bed 505 is comprised of particles having an equivalent particle diameter. The particles comprising moving packed bed 505 do not move relative to each other, and the void fraction in moving packed bed 505 is assumed to have a constant, though unknown, value. Standpipe 503 has aeration ports 509 and 512 injecting air into standpipe 503 in order to assist the movement of moving packed bed 505 down standpipe 503. Gas flow 511 flows axially in standpipe 503 and through moving packed bed 505 at a velocity $V_{GAS}$ with respect to standpipe 503. Although represented in FIG. 5 as a flow in the upward direction, gas flow 511 may flow either up or down in standpipe 503.

A standpipe axial length of the standpipe experiencing moving packed bed flow, represented in FIG. 5 as the axial length of standpipe 503 from axis AA' to axis BB', will typically be known to standpipe operators. This standpipe axial length is necessarily within what is often referred to as the dense phase of the standpipe, where the free-falling particles begin to accumulate in the standpipe and form a distinct bed level. Numerous methods exist for determining the onset of dense phase standpipe operation based on operating conditions within the standpipe itself. See, e.g., "The control of bed height and solids circulation rate in the standpipe of a cold flow circulating fluidized bed", Park, J., et al., *Powder Technology*, Vol 150, Issue 3 (February 2005). Similarly, the equivalent particle diameter of the particles may be determined experimentally, or may be may be obtained based on existing reference materials. See *Chemical Reactor Analysis and Design*, Froment, F. Wiley, (1990), and see *Industrial Catalysis: Optimizing Catalysts and Processes*, Ruud, J., et al., Wiley-VCH (1998).

Referring to FIG. 5, first section 518 is identified within the standpipe axial length of standpipe 503 from axis CC' to axis DD' such that aeration by aeration ports 512 and 509 does not occur within first section 518 volume. This is a significant requirement, as subsequent steps in the methodology presented herein assume the mass flow of gas entering and exiting the first section 518 at axes CC' and DD' are equivalent. First section has first differential pressure sensor 514 providing differential pressure indication of gas flow 511 as gas flow 511 flows through moving packed bed 505 over a first pressure length, and has first gas velocity sensor 515. Gas flow 511 has a first gas density and a first gas viscosity in the first section 518 determined by the operating conditions in first section 518.

Similarly, second section 519 is identified within the standpipe axial length of standpipe 503 from axis EE' to axis FF' such that aeration by aeration ports 512 and 509 does not occur within second section 519 volume, but such that at least one aeration port, here illustrated as aeration port 509, provides aeration to standpipe 503 between first section 518 and second section 519. This is additionally a significant requirement, as subsequent steps in the methodology presented herein assume that gas velocity of the gas flow 511 through second section 519 is altered from the gas velocity of gas flow 511 through first section 518. Second section 519 has second differential pressure sensor 516 providing differential pressure indication of gas flow 511 as gas flow 511 flows through moving packed bed 505 over a second pressure length, and second gas velocity sensor 517. Gas flow 511 has a second gas density and a second gas viscosity in the second section 519 determined by the operating conditions in second section 519.

Referring to FIG. 5, a first differential pressure per unit length is determined using first differential pressure sensor 514 and the first pressure length. First gas velocity with respect to the standpipe 503 is measured using first gas velocity sensor 515. Similarly, a second differential pressure per unit length is determined using second differential pressure sensor 516 and the second pressure length. Second gas velocity with respect to the standpipe 503 is measured using second gas velocity sensor 515.

Using equations (1) and (2), an Ergun correlation is formulated for the first section:

$$\frac{\Delta P_1}{\Delta L_1} = \frac{150\mu_1[\varepsilon(V_{GAS1} - V_{BED})](1-\varepsilon)^2}{D_p^2 \varepsilon^3} + \frac{1.75\rho_1 \varepsilon^2 (V_{GAS1} - V_{BED})|(V_{GAS1} - V_{BED})|(1-\varepsilon)}{D_p \varepsilon^3} \quad (3)$$

Using;
$\Delta P_1$=first differential pressure determined by first differential pressure sensor 514,
$\Delta L_1$=first pressure length,
$V_{GAS1}$=first gas velocity determined by first gas velocity sensor 515,
$D_p$=equivalent particle diameter of particles comprising fixed moving bed 505,
$\mu_1$=first gas viscosity of gas flow 511 in first section 518,
$\rho_1$=first gas density of gas flow 511 in first section 518.

Similarly, using equations (1) and (2), an Ergun correlation is formulated for the second section:

$$\frac{\Delta P_2}{\Delta L_2} = \frac{150\mu_2[\varepsilon(V_{GAS2} - V_{BED})](1-\varepsilon)^2}{D_p^2 \varepsilon^3} + \frac{1.75\rho_2 \varepsilon^2 (V_{GAS2} - V_{BED})|(V_{GAS1} - V_{BED})|(1-\varepsilon)}{D_p \varepsilon^3} \quad (4)$$

Using;
$\Delta P_2$=second differential pressure determined by second differential pressure sensor 516,
$\Delta L_2$=second pressure length,
$V_{GAS2}$=second gas velocity determined by second gas velocity sensor 517,
$D_p$=equivalent particle diameter of particles comprising fixed moving bed 505,
$\mu_2$=second gas viscosity of gas flow 511 in second section 519,
$\rho_2$=second gas density of gas flow 511 in second section 519.

As discussed previously, since the moving packed bed 505 extends from axis AA' to axis BB', the void fraction $\varepsilon$ and bed velocity $V_{BED}$ of moving packed bed 505 are constant, though unknown. Additionally, because aeration port 509 injects air into standpipe 503 between the first instrumented section and the second instrumented section, this alters the operating conditions in first section 518 from the operating conditions in second section 519, and equations (3) and (4) present a solvable set of equations. Void fraction $\varepsilon$ may therefore be determined based on the operating standpipe conditions measured, as well as bed velocity $V_{BED}$, using appropriate mathematical methods known to those skilled in the art. For example, Equations (3) and (4) may be solved for void fraction $\varepsilon$ and bed velocity $V_{BED}$ using EXCEL SOLVER.

It is important to note that the presence of at least one aeration port between the first section and the second section is critical to the success of this particular technique. Otherwise, $V_{GAS1}$ will approximately equal $V_{GAS2}$, and formulations of equations (3) and (4) as above will reflect substantially similar conditions. In that situation, solution of equations (3) and (4) will not produce useful results for void fraction E, and consequently for bed velocity $V_{BED}$. Note, however, that when determining void fraction $\varepsilon$ using a first and second section, it is not necessary that the mass flow rate of aeration air through aeration ports 509 and 512 be known values. It is only necessary that the aeration air mass flow rate be sufficient to alter the first gas velocity through first section 518 from the second gas velocity through second section 519 such that the simultaneous solution produces a meaningful result. Preferably, the mass flow rate of aeration air is at least 5% of the total aeration mass flow supplied to the standpipe 503. Having determined void fraction $\epsilon$ and bed velocity $V_{BED}$, the solids circulation rate (SCR) can determined by:

$$SCR = V_{BED} A_{BED} (1-\epsilon) \rho_{SOLID} \quad (5)$$

where:
$A_{BED}$ is the cross-sectional area of the moving packed bed 505, and
$\rho_{SOLID}$ is the density of a particle comprising moving packed bed 505.

Thus, solids circulation rate is determined using superficial gas velocity and void fraction based on measured parameters within the standpipe, rather than reliance on tabulated values or empirical correlations relating the two quantities. The method relies on application of the Ergun correlations across multiple sections of a standpipe separated by at least one aeration port. Aeration from the aeration port between the sections alters operating conditions from section to section, and Ergun correlations in conjunction with conservation equations allow solvable equations for superficial gas velocity $V_{SUP}$ and void fraction $\epsilon$ based on observed operating parameters.

It can be recognized that a point of novelty in this method is the manner in which Ergun correlations relating pressure drop and gas velocity are applied to specific standpipe sections to produce descriptive equations that allow determination of void fraction and bed velocity based on in-situ measurement. Once standpipe sections are identified and measurements obtained under the conditions specified, the mathematical operations necessary for determination of void fraction and bed velocity are straightforward and consistent. As such, this methodology lends itself to an online system which samples measured parameters periodically and provides an updated indication of solids circulation rate based on the sampled measurement.

Figure 6:
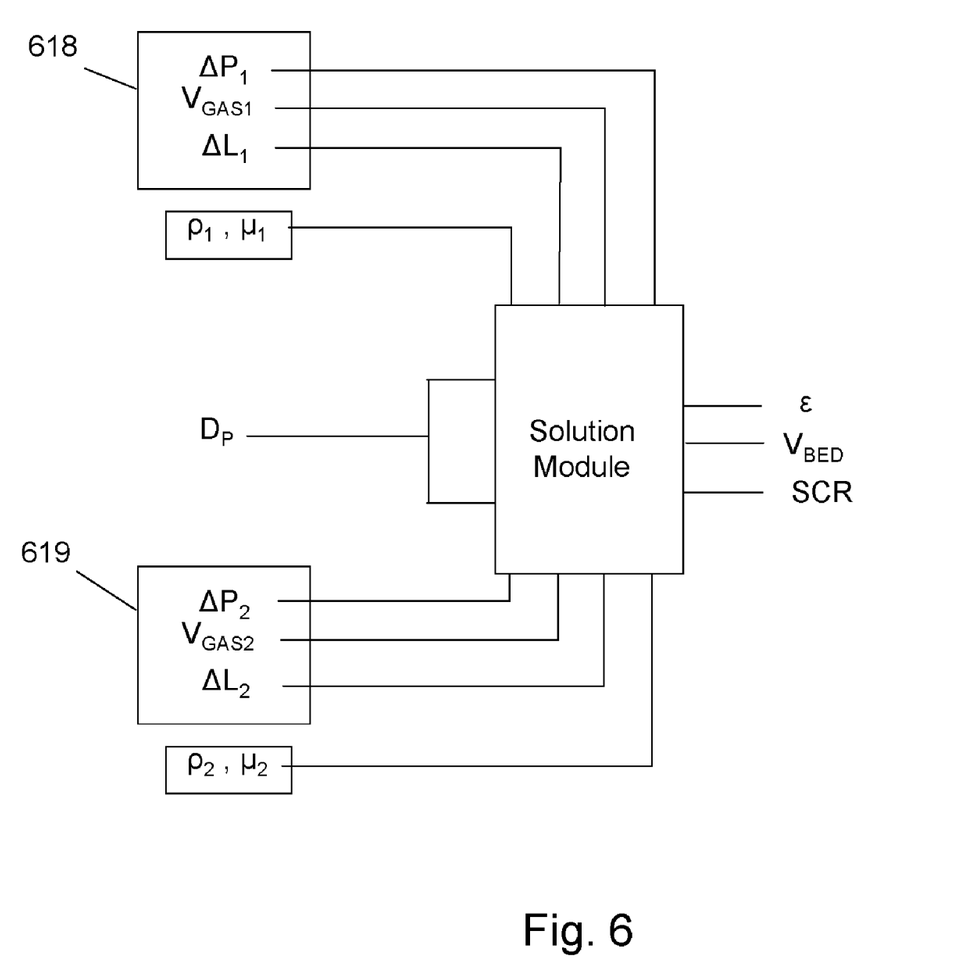
FIG. 6 illustrates an online system for the determination of solids circulation rate using one embodiment of the method.

One such system is represented schematically at FIG. 6 for the standpipe shown in FIG. 5 discussed supra. Referring to FIG. 6, a first instrumented section 618 and a second instrumented section 619 is in communication with a Solution Module to provide respective values of differential pressure per unit axial length and gas velocity. Gas densities and gas viscosities for the first and second instrumented sections are determined and provided to the Solution Module based on actual or estimated pressure and temperature conditions in the first instrumented section, and equivalent particle diameter $D_P$ is determined for the bed material and provided to the Solution Module. The Solution Module receives the inputs, formulates equations relating pressure drop and gas velocity similar to equations (3) and (4), and determines the resulting void fraction $\epsilon$ and bed velocity $V_{BED}$.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as it each individual publication or patent document were so individually denoted.

What is claimed is:

1. A method of determining a moving packed bed velocity comprising:
   providing a standpipe having a standpipe net a standpipe outlet, a standpipe axial length from the standpipe net to the standpipe outlet, and a standpipe interior, where the stand interior is a volume between the standpipe inlet and the standpipe outlet and bounded by the standpipe;
   providing a moving packed bed in the standpipe, where the moving packed bed extends from the standpipe inlet to the standpipe outlet;
   defining a first axial length, where the first axial length is a first segment of the standpipe axial length and where the first segment originates at a first inlet point and terminates at a first outlet point, and where the first inlet point is between the standpipe inlet and the first outlet point, and defining a first section inlet, where the first section inlet is an area bounded by the standpipe and perpendicular to the first axial length at the first inlet point, and defining a first section outlet, where the first section outlet is an area bounded by the standpipe and perpendicular to the first axial length at the first outlet point, and defining a first section volume, where the first section volume is bounded by the first section inlet, the first section outlet, and a first portion of the standpipe, where the first portion of the standpipe extends from the first section inlet to the first section outlet;
   defining a second axial length, where the second axial length is a second segment of the standpipe axial length, and where the second segment originates at a second inlet point and terminates at a second outlet point, and where the second inlet point is between the first outlet point and the second outlet point, and defining a second section inlet, where the second section inlet is an area bounded by the standpipe and perpendicular to the second axial length at the second inlet point, and defining a second section outlet, where the second section outlet is an area bounded by the standpipe and perpendicular to the second axial length at the second outlet point, and defining second section volume, where the second section volume is bounded by the second section inlet, the second section outlet, and a second portion of the standpipe, where the second portion of the standpipe extends from the second section inlet to the second section outlet;
   defining a volume between the first section volume and the second section volume, where the volume between the first section volume and the second section volume is bounded by the first section outlet, the second section inlet, and a portion of the standpipe extending from the first section outlet to the second section inlet;
   providing a fluid flow through the first section volume, the second section volume, and the volume between the first section volume and the second section volume, where the fluid flow has a flow direction, where the flow direction is either from the first section inlet to the second section outlet or from the second section outlet to the first section inlet;
   providing an aeration flow to the standpipe interior, where the aeration flow fluidly communicates with the standpipe interior within the volume between the first section volume and the second section volume;

measuring a first differential pressure over a first pressure length, where the first pressure length is between the first section inlet and the first section outlet and parallel to the first axial length; in the first section using the first differential pressure means;

measuring a first gas velocity over a first gas length, where the first gas length is between the first section inlet and the first section outlet and parallel to the first axial length;

measuring a second differential pressure over a second pressure length, where the second pressure length is between the second section inlet and the second section outlet and parallel to the second axial length;

measuring a second gas velocity over a second gas length, where the second gas length is between the second section inlet and the second section outlet and parallel to the second axial length;

formulating a first Ergun correlation relating the first differential pressure, the first pressure length, and the first gas velocity;

formulating a second Ergun correlation relating the second differential pressure, the second pressure length, and the second gas velocity; and utilizing a numerical or mathematical method to determine the moving packed bed velocity of the moving packed bed in the standpipe, by determining the moving packed bed velocity which satisfies the first Ergun correlation and the second Ergun correlation within a desired accuracy.

2. The method of claim 1 further comprised of determining a void fraction of the moving packed bed by determining the moving packed bed velocity which satisfies the first Ergun correlation and the second Ergun correlation within the desired accuracy.

3. The method of claim 1, wherein the aeration flow has a mass flow rate of at least 5% of the highest mass flow rate in the section volume and the second section volume.

4. The method of claim 1, wherein the first and second Ergun correlations have the form $dP/dL = A V_R + B \rho_{GAS} V_R^2$, where dP/DL represents a pressure drop per unit length, $V_R$ describes a relative velocity between a gas flow and the moving packed bed, $\rho_{GAS}$ describes the density of the gas flow, and A and B are formulations, where either A or B may have a zero value.

5. The method of claim 4 wherein the first Ergun correlation has the form:

$$\frac{\Delta P_1}{\Delta L_1} = \frac{150\mu_1[\varepsilon(V_{GAS1} - V_{BED})](1-\varepsilon)^2}{D_p^2\varepsilon^3} + \frac{1.75\rho_1\varepsilon^2(V_{GAS1} - V_{BED})|(V_{GAS1} - V_{BED})|(1-\varepsilon)}{D_p\varepsilon^3}$$

where;
$\Delta P_1$=the first differential pressure,
$\Delta L_1$=the first pressure length,
$V_{GAS1}$=the first gas velocity,
$D_p$=an equivalent particle diameter of particles comprising the moving packed bed,
$\mu_1$=a gas viscosity of a fluid flow in the first section volume,
$\rho_1$=a gas density of the fluid flow in the first section volume
$\varepsilon$=a void fraction of the moving packed bed,
$V_{BED}$=the moving packed bed velocity, wherein the second Ergun correlation has the form:

$$\frac{\Delta P_2}{\Delta L_2} = \frac{150\mu_2[\varepsilon(V_{GAS2} - V_{BED})](1-\varepsilon)^2}{D_p^2\varepsilon^3} + \frac{1.75\rho_2\varepsilon^2(V_{GAS2} - V_{BED})|(V_{GAS2} - V_{BED})|(1-\varepsilon)}{D_p\varepsilon^3}$$

where;
$\Delta P_2$=the second differential pressure,
$\Delta L_2$=the second pressure length,
$V_{GAS2}$=the second gas velocity,
$D_p$=the equivalent particle diameter of particles comprising the moving packed bed,
$\mu_2$=a gas viscosity of a fluid flow in the first section volume,
$\rho_2$=a gas density of the fluid flow in the first section volume,
$\varepsilon$=the void fraction of the moving packed bed, and
$V_{BED}$=the moving packed, bed velocity.

6. An apparatus for determining the moving packed bed velocity using the method of claim 4, the apparatus comprised of a solution module, where the solution module is programmed to receive an input representing the first, differential pressure, an input representing the first pressure length, and an input representing the first, gas velocity as first input data and formulate the first Ergun correlation using the first input data, and where the solution module is programmed to receive an input representing the second differential pressure an input representing the second pressure length, and an input representing the second gas velocity as second input data and formulate the second Ergun correlation using the second input data, and where the solution module is programmed to utilize the numerical or mathematical method to determine the moving packed bed velocity of the moving packed bed in the standpipe, by determining the moving packed bed velocity which satisfies the first Ergun correlation and the second Ergun correlation within the desired accuracy.

7. The apparatus of claim 6 where the solution module further determines a moving bed void fraction by determining the moving packed bed velocity which satisfies the first Ergun correlation and the second Ergun correlation within the desired accuracy.

8. The apparatus of claim 6 wherein the first Ergun correlation has the form:

$$\frac{\Delta P_1}{\Delta L_1} = \frac{150\mu_1[\varepsilon(V_{GAS1} - V_{BED})](1-\varepsilon)^2}{D_p^2\varepsilon^3} + \frac{1.75\rho_1\varepsilon^2(V_{GAS1} - V_{BED})|(V_{GAS1} - V_{BED})|(1-\varepsilon)}{D_p\varepsilon^3}$$

where;
$\Delta P_1$=the first differential pressure,
$\Delta L_1$=the first, pressure length,
$V_{GAS1}$=the first gas velocity,
$D_p$=an equivalent particle diameter of particles comprising the moving packed bed,
$\mu_1$=a gas viscosity of a fluid flow in the first section volume,
$\rho_1$=a gas density of the fluid flow in the first section volume,
$\varepsilon$=a void fraction of the moving packed bed, $V_{BED}$=the moving packed bed velocity, and where the second Ergun correlation has the form:

$$\frac{\Delta P_2}{\Delta L_2} = \frac{150\mu_2[\varepsilon(V_{GAS2} - V_{BED})](1-\varepsilon)^2}{D_p^2 \varepsilon^3} +$$

$$\frac{1.75\rho_2 \varepsilon^2 (V_{GAS2} - V_{BED})|(V_{GAS2} - V_{BED})|(1-\varepsilon)}{D_p \varepsilon^3}$$

where;
$\Delta P_1$=the second differential pressure,
$\Delta L_2$=the second pressure length,
$V_{GAS2}$=the second gas velocity,
$D_p$=the equivalent particle diameter of particles comprising the moving packed bed,
$\mu_2$=a gas viscosity of a fluid flow in the first section volume,
$\rho_2$=a gas density of the fluid flow in the first section volume,
$\varepsilon$=the void fraction of the moving packed bed, and
$V_{BED}$=the moving packed bed velocity.

9. The apparatus of claim 6 further comprised of:
the standpipe having the standpipe inlet, the standpipe outlet, the standpipe axial length, and the standpipe interior, the standpipe further comprised of,
a first instrumented section, where the first instrumented section has a first instrumented section axis coincident with and equivalent to the first axial length, and where the first, instrumented section has a first instrumented section inlet coincident with and equivalent to the first section inlet, and where the first instrumented section has a first instrumented section outlet coincident with and equivalent to the first section outlet, and where the first instrumented section has a first instrumented section volume coincident with and equivalent to the first section volume,
a second instrumented section, where the second instrumented section has a second instrumented section axis coincident with and equivalent to the second axial length, and where the second instrumented section has a second instrumented section inlet coincident with and equivalent to the second section inlet, and where the second instrumented section has a second instrumented section outlet coincident with and equivalent to the second section outlet, and where the second instrumented section has a second instrumented section volume coincident with and equivalent to the second section volume and,
a volume between the first instrumented section and the second instrumented section, where the volume between the first instrumented section and the second instrumented section is coincident with and equivalent to the volume between the first section volume and the second section volume;
a fluid supply inlet in fluid communication with the standpipe interior for providing the fluid flow, where the fluid supply inlet fluidly communicates with the standpipe interior outside of the first instrumented section and outside of the second instrumented section and outside of the urge between the first instrumented section and the second instrumented section;
an aeration port in fluid communication with the standpipe interior for providing the aeration flow, where the aeration port fluidly communicates with the standpipe interior within the volume between the first instrumented section and the second instrumented section;

a first differential pressure instrument in communication with the standpipe interior for measurement of the first differential pressure, where the first differential pressure instrument measures a first instrumented differential pressure between two points over a first instrumented pressure length where the first instrumented pressure length is coincident with and equivalent to the first pressure length, and where the that differential pressure instrument is in data communication with the solution module, such that the solution module may receive the input representing the first differential pressure from the first differential pressure instrument;
a first gas velocity instrument in communication with the standpipe interior for measurement of the first gas velocity where the first gas velocity instrument measures a first instrumented gas velocity over a first instrumented gas length, where the first instrumented gas length is coincident with and equivalent to the first gas length, and where the first gas velocity instrument is in data communication with the sol ion module, such that the solution module may receive the input representing the first gas velocity from the first gas velocity instrument;
a second differential pressure instrument in communication with the standpipe interior for measurement of the second differential pressure, where the second differential pressure instrument measures a second instrumented differential pressure between two points over a second instrumented pressure length, where the second instrumented pressure length is coincident with and equivalent to the second pressure length, and where the second differential pressure instrument is in data communication with the solution module, such that the solution module may receive the input representing the second differential pressure; from the second differential pressure instrument; and
a second gas velocity instrument in communication with the standpipe interior for measurement of the second gas velocity, where the second gas velocity instrument measures a second instrumented gas velocity over a second instrumented gas length, where the second instrumented gas length is coincident with and equivalent to the second gas length, and where the second gas velocity instrument is in data communication with the solution module such that the solution module may receive the input representing the second gas velocity from the second gas velocity instrument.

10. The apparatus of claim 9 where the fluid supply inlet is a plurality of aeration ports where each aeration port in the plurality of aeration ports fluidly communicates with the standpipe interior outside of the first instrumented section and outside of the second instrumented section and outside of the volume between the first instrumented section and the second instrumented section.

11. The apparatus of claim 10 wherein the first differential pressure instrument is one of a bellows, diaphragm, or semiconductor strain sensor relaying the input representing the first differential pressure using an analog pneumatic, analog electronic, or digital electronic signal, and wherein the second differential pressure instrument is one of a bellows, diaphragm, or semiconductor strain sensor relaying the input representing the second differential pressure using an analog pneumatic, analog electronic, or digital electronic signal.

12. The apparatus of claim 11 where the first gas velocity instrument is a gas tracer instrument employing a first bridge circuit containing a first thermistor as the active element and a first solenoid valve that allows a pulsed injection of helium into the standpipe through a first helium injection point, where the first thermistor and the first helium injection point are separated by the first instrumented gas length, and wherein the second gas velocity instrument is a gas tracer instrument employing a second bridge circuit containing a second thermistor as the active element and a second solenoid valve that allows a pulsed injection of helium into the standpipe through a second helium injection point, where the second thermistor and the second helium injection point are separated by the second instrumented gas length.

13. The apparatus of claim 10 wherein the standpipe is a component in a circulating fluidized bed reactor, and where the circulating fluidized bed reactor is further comprised of:
   a reactor vessel;
   a particulate collection system, where the reactor vessel is in fluid communication with the particulate collection system and where the particulate collection system is in fluid communication with the standpipe inlet, such that a standpipe inlet particulate flog path from the reactor vessel to the standpipe inlet, and such that the particulate collection system is between the reactor vessel and the standpipe inlet in the standpipe inlet particulate flowpath; and
   a solids flow control valve, where the standpipe outlet is in fluid communication with the solids flow control valve and where the solids flow control valve is in fluid communication with the reactor vessel, such that a standpipe outlet particulate flowpath exists from the standpipe outlet to the reactor vessel, and such that the solids flow control valve is between the standpipe outlet and the reactor vessel in the standpipe outlet particulate flowpath.

14. An apparatus for determining the solids circulation rate of a circulating fluidized bed reactor using the method of claim 4, the apparatus comprised of:
   the standpipe having the standpipe inlet, the standpipe outlet, the standpipe axial length, and the standpipe interior, the standpipe further comprised of,
      a first instrumented section, where the first instrumented section has a first instrumented section axis coincident with and equivalent to the first axial length, and where the first instrumented section has a first instrumented section inlet coincident with and equivalent to the first section inlet, and where the first instrumented section has a first instrumented section outlet coincident with and equivalent to the first section outlet, and where the first instrumented section has a first instrumented section volume coincident with and equivalent to the first section volume,
      a second instrumented section, where the second instrumented section has a second instrumented section axis coincident with and equivalent to the second axial length, and where the second instrumented section has a second instrumented section inlet coincident with and equivalent to the second section inlet, and where the second instrumented section has a second instrumented section outlet coincident with and equivalent to the second section outlet, and where the second instrumented section has a second instrumented section volume coincident with and equivalent to the second section volume and,
      a volume between the first instrumented section and the second instrumented section, where the volume between the first instrumented section and the second instrumented section is coincident with and equivalent to the volume between the first section volume and the second section volume;
   a fluid supply inlet in fluid communication with the standpipe interior for providing the fluid flow, where the fluid supply inlet fluidly communicates with the standpipe interior outside of the first instrumented section and outside of the second instrumented section and outside of the volume between the first instrumented section and the second instrumented section;
   an aeration port in fluid communication with the standpipe interior for providing the aeration flow, where the aeration port fluidly communicates with the standpipe interior within the between the first instrumented section and the second instrumented section;
   a first differential pressure instrument in communication with the standpipe interior for measurement of the first differential pressure, where the first differential pressure instrument measures a first instrumented differential pressure between two points over a first instrumented pressure length, where the first instrumented pressure length is coincident with and equivalent to the first pressure length;
   a first gas velocity instrument in communication with the standpipe interior for measurement of the first gas velocity, where the first gas velocity instrument measures a first instrumented gas velocity over a first instrumented gas length, where the first instrumented gas length is coincident with and equivalent to the first as length;
   a second differential pressure instrument in communication with the standpipe interior for measurement of the second differential pressure, where the second differential pressure instrument measures a second instrumented differential pressure between two points over a second instrumented pressure length, where the second instrumented pressure length is coincident with and equivalent to the second pressure length;
   a second gas velocity instrument in communication with the standpipe interior for measurement of the second gas velocity, where the second gas velocity instrument measures a second instrumented gas velocity over a second instrumented gas length, where the second instrumented gas length is coincident with and equivalent to the second gas length;
   a reactor vessel;
   a particulate collection system, where the reactor vessel is in fluid communication with the particulate collection system and where the particulate collection system is in fluid communication with the standpipe inlet, such that a standpipe inlet particulate flowpath exists from the reactor vessel to the standpipe inlet, and such that the particulate collection system is between the reactor vessel and the standpipe inlet in the standpipe inlet particulate flowpath;
   a solids flow control valve, where the standpipe outlet is in fluid communication with the solids flow control valve and where the solids flow control valve is in fluid communication with the reactor vessel, such that a standpipe outlet particulate flowpath exists from the standpipe outlet to the reactor vessel, and such that the solids flow control valve is between the standpipe outlet and the reactor vessel in the standpipe outlet particulate flowpath; and
   a solution module, where the solution module is programmed to receive an input representing the first differential pressure, an input representing the first pressure length, and an input representing the first gas velocity as first input data and formulate the first Ergun correlation using the first input data, and where the solution module is in data communication with the first differential pressure instrument, such that the solution module may receive the input representing the first differential pressure from the first differential pressure instrument, and where the solution module is in data communication with the first gas velocity instrument, such that the solution module may receive the input representing the first gas velocity from the first gas velocity instrument, and where the solution module is programmed to receive an input representing the second differential pressure, an input representing the second pressure length, and an input representing the second gas velocity as second input data and formulate the second Ergun correlation using the second input data, where the solution module is in data communication with the second differential pressure instrument, such that the solution module may receive the input representing the second differential pressure from the second differential pressure instrument, and where the solution module is in data communication with the second gas velocity instrument such that the solution module may receive the input representing the second gas velocity from the second gas velocity instrument, and where the solution module is programmed to utilize the numerical or mathematical method to determine the moving packed bed velocity and a void fraction of the moving packed bed in the standpipe, by determining the moving packed bed velocity and the void fraction which satisfies the first Ergun correlation and the second Ergun correlation within the desired accuracy, and where the solution module is programmed to calculate the solids circulation rate in the standpipe using the moving packed bed velocity and the void fraction which satisfies the first Ergun correlation and the second Ergun correlation within the desired accuracy.

15. The apparatus of claim 14 where the fluid supply inlet is a plurality of aeration ports, where each aeration port in the plurality of aeration ports fluidly communicates with the standpipe interior outside of the first instrumented section and outside of the second instrumented section and outside of the volume between the first instrumented section and the second instrumented section.

16. The apparatus of claim 15 where the aeration has a mass flow rate of at least 5% of the highest mass flow rate in the first section volume and the second section volume.

17. The apparatus of claim 16 wherein the first Ergun correlation has the form:

$$\frac{\Delta P_1}{\Delta L_1} = \frac{150\mu_1[\varepsilon(V_{GAS1} - V_{BED})](1-\varepsilon)^2}{D_p^2 \varepsilon^3} + \frac{1.75\rho_1\varepsilon^2(V_{GAS1} - V_{BED})|(V_{GAS1} - V_{BED})|(1-\varepsilon)}{D_p \varepsilon^3}$$

where;
$\Delta P_1$=the first differential pressure,
$\Delta L_1$=the first pressure length,
$V_{GAS1}$=the first gas velocity,
$D_p$=an equivalent particle diameter of particles comprising the moving packed bed,
$\mu_1$=a gas viscosity of a fluid flow in the first section volume,
$\rho_1$=a gas density of the fluid flow in the first section Volume,
$\varepsilon$=the void fraction of the moving packed bed,
$V_{BED}$=the moving packed bed velocity,
and where the second Ergun correlation has the form:

$$\frac{\Delta P_2}{\Delta L_2} = \frac{150\mu_2[\varepsilon(V_{GAS2} - V_{BED})](1-\varepsilon)^2}{D_p^2 \varepsilon^3} + \frac{1.75\rho_2\varepsilon^2(V_{GAS2} - V_{BED})|(V_{GAS2} - V_{BED})|(1-\varepsilon)}{D_p \varepsilon^3}$$

where;
$\Delta P_2$=the second differential pressure,
$\Delta L_2$=the second pressure length,
$V_{GAS2}$=the second gas velocity,
$D_p$=the equivalent particle diameter of particles comprising the moving packed bed,
$\mu_2$=a gas viscosity of a fluid flow in the first section volume,
$\rho_2$=a gas density of the fluid flow in the first section volume,
$\varepsilon$=the void fraction of the moving packed bed, and
$V_{BED}$=the moving packed bed velocity.

* * * * *